US012028777B2

(12) United States Patent
Perez et al.

(10) Patent No.: US 12,028,777 B2
(45) Date of Patent: Jul. 2, 2024

(54) APPARATUS AND METHOD TO INDICATE WHETHER A NODE IS TRACKING THE LOCATION OF A USER EQUIPMENT

(71) Applicant: Nokia Technologies Oy, Espoo (FI)

(72) Inventors: Eva Perez, Munich (DE); Timo Koskela, Oulu (FI); Diomidis Michalopoulos, Munich (DE); Mikko Saily, Laukkoski (FI)

(73) Assignee: Nokia Technologies Oy, Espoo (FI)

( * ) Notice: Subject to any disclaimer, the term of this patent is extended or adjusted under 35 U.S.C. 154(b) by 442 days.

(21) Appl. No.: 17/609,656

(22) PCT Filed: May 13, 2019

(86) PCT No.: PCT/EP2019/062154
§ 371 (c)(1),
(2) Date: Nov. 8, 2021

(87) PCT Pub. No.: WO2020/228936
PCT Pub. Date: Nov. 19, 2020

(65) Prior Publication Data
US 2022/0232347 A1    Jul. 21, 2022

(51) Int. Cl.
*H04W 64/00* (2009.01)
*G01S 5/02* (2010.01)
*G01S 5/14* (2006.01)
*H04W 4/02* (2018.01)
*H04W 4/029* (2018.01)

(52) U.S. Cl.
CPC .................. *H04W 4/029* (2018.02)

(58) Field of Classification Search
CPC ................ H04W 4/029; H04W 8/10
See application file for complete search history.

(56) References Cited

U.S. PATENT DOCUMENTS

2016/0165487 A1* 6/2016 Zhu ................. H04W 28/10
  455/456.2
2020/0128507 A1* 4/2020 Ryu ................ H04W 64/003

FOREIGN PATENT DOCUMENTS

WO    2019/083596 A1    5/2019

OTHER PUBLICATIONS

"3rd Generation Partnership Project; Technical Specification Group Radio Access Network; Study on NR positioning support (Release 16)", 3GPP TR 38.855, V16.0.0, Mar. 2019, pp. 1-197.
"3rd Generation Partnership Project; Technical Specification Group Radio Access Network; NG Radio Access Network (NG-RAN); Stage 2 functional specification of User Equipment (UE) positioning in NG-RAN (Release 15)", 3GPP TS 38.305, V15.3.0, Mar. 2019, pp. 1-69.
"3rd Generation Partnership Project; Technical Specification Group Radio Access Network; NG-RAN; NG Application Protocol (NGAP) (Release 15)", 3GPP TS 38.413, V15.3.0, Mar. 2019, pp. 1-319.

(Continued)

*Primary Examiner* — Moustapha Diaby
(74) *Attorney, Agent, or Firm* — Nokia Technologies Oy

(57) ABSTRACT

An apparatus comprising means configured to: manage at least one location request for at least one user equipment based on an indicator indicating whether a node associated with the location determination for the at least one user equipment is tracking the location for the at least one user equipment.

20 Claims, 7 Drawing Sheets

(56) References Cited

OTHER PUBLICATIONS

"3rd Generation Partnership Project; Technical Specification Group Services and System Aspects; Procedures for the 5G System; Stage 2 (Release 16)", 3GPP TS 23.502, V16.0.2, Apr. 2019, pp. 1-419.
International Search Report and Written Opinion received for corresponding Patent Cooperation Treaty Application No. PCT/EP2019/062154, dated Nov. 14, 2019, 14 pages.
"NG-RAN Positioning Architecture and Procedures", 3GPP TSG-RAN WG2 Meeting #104, R2-1817898, Agenda: 11.8.2, Qualcomm Incorporated, Nov. 12-16, 2018, 17 pages.

\* cited by examiner

APPARATUS AND METHOD TO INDICATE WHETHER A NODE IS TRACKING THE LOCATION OF A USER EQUIPMENT

RELATED APPLICATION

This application claims priority to PCT Application No. PCT/EP2019/062154, filed on May 13, 2019, the contents is incorporated herein by reference in its entirety.

FIELD

The present application relates to a method, apparatus, system and computer program and in particular but not exclusively to location management functionality within communication systems.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite-based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus comprising means configured to: manage at least one location request for at least one user equipment based on an indicator indicating whether a node associated with the location determination for the at least one user equipment is tracking the location for the at least one user equipment.

The apparatus may be one of: an access management function node; a radio access network node comprising a location management function; a user equipment and a location management function node.

The means for may be further configured to receive the indicator from one of: the user equipment in communication with the node associated with the location determination for the at least one user equipment; and the node associated with the location determination for the at least one user equipment.

The indicator may be one of: an information element within a location report message; an information element within a location indication message; an information element within a capability message; and an information element within a measurement message.

The apparatus may be an access management function and wherein the means configured to manage the at least one location request for the at least one user equipment based on the indicator indicating whether the node associated with the location determination for the at least one user equipment is tracking the location for the at least one user equipment may be configured to: receive the at least one location request for the at least one user equipment; generate at least one location service request to be transmitted to the node associated with the location determination for the at least one user equipment when the indicator is indicating that the node associated with the location determination for the at least one user equipment is tracking the location for the at least one user equipment; receive, from the node associated with the location determination for the at least one user equipment, a location for the at least one user equipment; provide the location for the at least one user equipment as a response to the at least one location request for the at least one user equipment.

The means configured to manage the at least one location request for the at least one user equipment based on the indicator indicating whether the node associated with the location determination for the at least one user equipment is tracking the location for the at least one user equipment may be configured to terminate the at least one location request for at least one user equipment based on the location received from the node.

The means configured to manage at least one location request for at least one user equipment based on the indicator indicating whether the node associated with the location determination for the at least one user equipment is tracking the location for the at least one user equipment may be configured to: forward the at least one location request for the at least one user equipment to a location management function node when the indicator is indicating that the node associated with the location determination for the at least one user equipment is not tracking the location for the at least one user equipment, wherein the location management function node is configured to start a location process; receive a location for the at least one user equipment from the location management function; provide the location for the at least one user equipment as the response to the location request for the at least one user equipment.

The means configured to manage the at least one location request for the at least one user equipment based on the indicator indicating whether the node associated with the location determination for the at least one user equipment is tracking the location for the at least one user equipment may be configured to terminate the at least one location request for at least one user equipment based on the location received from the location management function.

The apparatus may comprise a location management function, and the means configured to manage the at least one location request for at least one user equipment based on the indicator indicating whether the node associated with the location determination for the at least one user equipment is tracking the location for the at least one user equipment may be configured to: receive the at least one location request for the at least one user equipment; generate at least one location update request to be transmitted to the node associated with the location determination for the at least one user equipment when the indicator is indicating that the node associated with the location determination for the at least one user equipment is tracking the location for the at least one user equipment; receive, from the node associated with the location determination for the at least one user equipment, a location for the at least one user equipment; provide the location for the at least one user equipment as a response to the at least one location request for the at least one user equipment.

The means configured to manage the at least one location request for the at least one user equipment based on the indicator indicating whether the node associated with the location determination for the at least one user equipment is tracking the location for the at least one user equipment may be configured to terminate the at least one location request for at least one user equipment based on the location received from the node.

The means configured to manage at least one location request for the at least one user equipment based on the indicator indicating whether the node associated with the location determination for the at least one user equipment is tracking the location for the at least one user equipment may be configured to: start a location process for the at least one user equipment when the indicator is indicating that the node associated with the location determination for the at least one user equipment is not tracking the location for the at least one user equipment; obtain a location for the at least one user equipment; provide the location for the at least one user equipment as the response to the location request.

The node associated with the location determination for the at least one user equipment may be one of: a radio access network node; a radio access network node comprising a location management function; and a/the location management function.

The location determination for the at least one user equipment may be obtained in response to at least one other location request.

According to a second aspect there is provided an apparatus comprising means configured to: generate at least one indicator to be transmitted to a further apparatus, the at least one indicator indicating whether a node associated with at least one other location determination for at least one user equipment is tracking the location for the at least one user equipment, wherein the further apparatus is configured to manage at least one location request for at least one user equipment based on the indicator indicating whether the node associated with the location determination for the at least one user equipment is tracking the location for the at least one user equipment.

The apparatus may be one of: the user equipment in communication with the node associated with the location determination for the at least one user equipment; and the node associated with the location determination for the at least one user equipment.

The further apparatus may be one of: an access management function, the access management function being configured to route the least one location request for at least one user equipment to the node associated with the location determination for the at least one user equipment when the indicator indicates the node associated with the location determination for the at least one user equipment is tracking the location for the at least one user equipment and a location management function for initialising a location determination otherwise; a location management function, the location management function being configured to receive the at least one location request from an access management function, the location management function configured request a location update from the node associated with the location determination for the at least one user equipment is tracking the location for the at least one user equipment and initialising a location determination otherwise.

The indicator may be one of: an information element within a location report message; an information element within a location indication message; an information element within a capability message; and an information element within a measurement message.

The node associated with the location determination for the at least one user equipment may be one of: a radio access network node; a radio access network node comprising a location management function; and a/the location management function.

The location determination for the at least one user equipment may be obtained in response to at least one other location request.

The apparatus may further comprise means configured to: receive a location service request or a location update request for the at least one user equipment from the further apparatus and send a location information for the at least one user equipment to the further apparatus.

According to a third aspect is provided a method comprising: managing at least one location request for at least one user equipment based on an indicator indicating whether a node associated with a location determination for the at least one user equipment is tracking the location for the at least one user equipment.

The apparatus may be one of: an access management function node; a radio access network node comprising a location management function; a user equipment and a location management function node.

The method may further comprise receiving the indicator from one of: the user equipment in communication with the node associated with the location determination for the at least one user equipment; and the node associated with the location determination for the at least one user equipment.

The indicator may be one of: an information element within a location report message; an information element within a location indication message; an information element within a capability message; and an information element within a measurement message.

The apparatus may be an access management function and wherein managing the at least one location request for the at least one user equipment based on the indicator indicating whether the node associated with the location determination for the at least one user equipment is tracking the location for the at least one user equipment may comprise: receiving the at least one location request for the at least one user equipment; generating at least one location service request to be transmitted to the node associated with the location determination for the at least one user equipment when the indicator is indicating that the node associated with the location determination for the at least one user equipment is tracking the location for the at least one user equipment; receiving, from the node associated with the location determination for the at least one user equipment, a location for the at least one user equipment; and providing the location for the at least one user equipment as a response to the at least one location request for the at least one user equipment.

Managing at least one location request for at least one user equipment based on the indicator indicating whether the node associated with the location determination for the at least one user equipment is tracking the location for the at least one user equipment may comprise terminating the at least one location request for at least one user equipment based on the location received from the node.

Managing at least one location request for at least one user equipment based on the indicator indicating whether the node associated with the location determination for the at least one user equipment is tracking the location for the at least one user equipment may comprise: forwarding the at least one location request for the at least one user equipment to a location management function node when the indicator is indicating that the node associated with the location determination for the at least one user equipment is not tracking the location for the at least one user equipment, wherein the location management function node is configured to start a location process; receiving a location for the at least one user equipment from the location management function; and providing the location for the at least one user equipment as the response to the location request for the at least one user equipment.

Managing at least one location request for at least one user equipment based on the indicator indicating whether the node associated with the location determination for the at least one user equipment is tracking the location for the at least one user equipment may comprise terminating the at least one location request for at least one user equipment based on the location received from the location management function.

The apparatus may comprise a location management function, and managing the at least one location request for at least one user equipment based on the indicator indicating whether the node associated with the location determination for the at least one user equipment is tracking the location for the at least one user equipment may comprise: receiving the at least one location request for the at least one user equipment; generating at least one location update request to be transmitted to the node associated with the location determination for the at least one user equipment when the indicator is indicating that the node associated with the location determination for the at least one user equipment is tracking the location for the at least one user equipment; receiving, from the node associated with the location determination for the at least one user equipment, a location for the at least one user equipment; and providing the location for the at least one user equipment as a response to the at least one location request for the at least one user equipment.

Managing at least one location request for at least one user equipment based on the indicator indicating whether the node associated with the location determination for the at least one user equipment is tracking the location for the at least one user equipment may comprise terminating the at least one location request for at least one user equipment based on the location received from the node Managing at least one location request for the at least one user equipment based on the indicator indicating whether the node associated with the location determination for the at least one user equipment is tracking the location for the at least one user equipment may comprise: starting a location process for the at least one user equipment when the indicator is indicating that the node associated with the location determination for the at least one user equipment is not tracking the location for the at least one user equipment; obtaining a location for the at least one user equipment; and providing the location for the at least one user equipment as the response to the location request.

The node associated with the location determination for the at least one user equipment may be one of: a radio access network node; a radio access network node comprising a location management function; and a/the location management function.

The location determination for the at least one user equipment may be obtained in response to at least one other location request.

According to a fourth aspect there is provided a method comprising: generating at least one indicator to be transmitted to an apparatus, the at least one indicator indicating whether a node associated with at least one other location determination for at least one user equipment is tracking the location for the at least one user equipment, wherein the apparatus is configured to manage at least one location request for at least one user equipment based on the indicator indicating whether the node associated with a location determination for the at least one user equipment is tracking the location for the at least one user equipment.

The method may be implemented within one of: the user equipment in communication with the node associated with the location determination for the at least one user equipment; and the node associated with the location determination for the at least one user equipment.

The apparatus may be one of: an access management function, the access management function being configured to route the least one location request for at least one user equipment to the node associated with the location determination for the at least one user equipment when the indicator indicates the node associated with the location determination for the at least one user equipment is tracking the location for the at least one user equipment and a location management function for initialising a location determination otherwise; a location management function, the location management function being configured to receive the at least one location request from an access management function, the location management function configured request a location update from the node associated with the location determination for the at least one user equipment is tracking the location for the at least one user equipment and initialising a location determination otherwise.

The indicator may be one of: an information element within a location report message; an information element within a location indication message; an information element within a capability message; and an information element within a measurement message.

The node associated with the location determination for the at least one user equipment may be one of: a radio access network node; a radio access network node comprising a location management function; and a/the location management function.

The location determination for the at least one user equipment may be obtained in response to at least one other location request.

The method may further comprise: receiving a location service request or a location update request for the at least one user equipment from the apparatus and sending a location information for the at least one user equipment to the apparatus.

In a fifth aspect there is provided an apparatus comprising: at least one processor and at least one memory including a computer program code, the at least one memory and computer program code configured to, with the at least one processor, cause the apparatus at least to: manage at least one location request for at least one user equipment based on an indicator indicating whether a node associated with the location determination for the at least one user equipment is tracking the location for the at least one user equipment.

The apparatus may be one of: an access management function node; a user equipment; and a location management function node.

The apparatus may be further caused to receive the indicator from one of: the user equipment in communication with the node associated with the location determination for the at least one user equipment; and the node associated with the location determination for the at least one user equipment.

The indicator may be one of: an information element within a location report message; an information element within a location indication message; an information element within a capability message; and an information element within a measurement message.

The apparatus may be an access management function and wherein the apparatus caused to manage the at least one location request for the at least one user equipment based on the indicator indicating whether the node associated with the location determination for the at least one user equipment is tracking the location for the at least one user equipment may be caused to: receive the at least one location request for the at least one user equipment; generate at least one location service request to be transmitted to the node associated with the location determination for the at least one user equipment when the indicator is indicating that the node associated with the location determination for the at least one user equipment is tracking the location for the at least one user equipment; receive, from the node associated with the location determination for the at least one user equipment, a location for the at least one user equipment; provide the location for the at least one user equipment as a response to the at least one location request for the at least one user equipment; and terminate the at least one location request for at least one user equipment based on the location received from the node.

The apparatus caused to manage at least one location request for at least one user equipment based on the indicator indicating whether the node associated with the location determination for the at least one user equipment is tracking the location for the at least one user equipment may be caused to: forward the at least one location request for the at least one user equipment to a location management function node when the indicator is indicating that the node associated with the location determination for the at least one user equipment is not tracking the location for the at least one user equipment, wherein the location management function node is configured to start a location process; receive a location for the at least one user equipment from the location management function; provide the location for the at least one user equipment as the response to the location request for the at least one user equipment; and terminate the at least one location request for at least one user equipment based on the location received from the location management function.

The apparatus may comprise a location management function, and the apparatus caused to manage the at least one location request for at least one user equipment based on the indicator indicating whether the node associated with the location determination for the at least one user equipment is tracking the location for the at least one user equipment may be caused to: receive the at least one location request for the at least one user equipment; generate at least one location update request to be transmitted to the node associated with the location determination for the at least one user equipment when the indicator is indicating that the node associated with the location determination for the at least one user equipment is tracking the location for the at least one user equipment; receive, from the node associated with the location determination for the at least one user equipment, a location for the at least one user equipment; provide the location for the at least one user equipment as a response to the at least one location request for the at least one user equipment; and terminate the at least one location request for at least one user equipment based on the location received from the node.

The apparatus caused to manage at least one location request for the at least one user equipment based on the indicator indicating whether the node associated with the location determination for the at least one user equipment is tracking the location for the at least one user equipment may be caused to: start a location process for the at least one user equipment when the indicator is indicating that the node associated with the location determination for the at least one user equipment is not tracking the location for the at least one user equipment; obtain a location for the at least one user equipment; provide the location for the at least one user equipment as the response to the location request.

The node associated with the location determination for the at least one user equipment may be one of: a radio access network node; a radio access network node comprising a location management function; and a/the location management function.

The location determination for the at least one user equipment may be obtained in response to at least one other location request.

According to a sixth aspect there is provided an apparatus comprising at least one processor and at least one memory including a computer program code, the at least one memory and computer program code configured to, with the at least one processor, cause the apparatus at least to: generate at least one indicator to be transmitted to a further apparatus, the at least one indicator indicating whether a node associated with at least one other location determination for at least one user equipment is tracking the location for the at least one user equipment, wherein the further apparatus is configured to manage at least one location request for at least one user equipment based on the indicator indicating whether the node associated with the location determination for the at least one user equipment is tracking the location for the at least one user equipment.

The apparatus may be one of: the user equipment in communication with the node associated with the location determination for the at least one user equipment; and the node associated with the location determination for the at least one user equipment.

The further apparatus may be one of: an access management function, the access management function being configured to route the least one location request for at least one user equipment to the node associated with the location determination for the at least one user equipment when the indicator indicates the node associated with the location determination for the at least one user equipment is tracking the location for the at least one user equipment and a location management function for initialising a location determination otherwise; a location management function, the location management function being configured to receive the at least one location request from an access management function, the location management function configured request a location update from the node associated with the location determination for the at least one user equipment is tracking the location for the at least one user equipment and initialising a location determination otherwise.

The indicator may be one of: an information element within a location report message; an information element within a location indication message; an information element within a capability message; and an information element within a measurement message.

The node associated with the location determination for the at least one user equipment may be one of: a radio access network node; a radio access network node comprising a location management function; and a/the location management function.

The location determination for the at least one user equipment may be obtained in response to at least one other location request.

The apparatus may further be caused to: receive a location service request or a location update request for the at least one user equipment from the further apparatus and send a location information for the at least one user equipment to the further apparatus.

In a seventh aspect there is provided a computer readable medium comprising program instructions for causing an apparatus to perform at least the following: managing at least one location request for at least one user equipment based on an indicator indicating whether a node associated with the location determination for the at least one user equipment is tracking the location for the at least one user equipment.

In an eighth aspect there is provided a computer readable medium comprising program instructions for causing an apparatus to perform at least the following: generating at least one indicator to be transmitted to a further apparatus, the at least one indicator indicating whether a node associated with at least one other location determination for at least one user equipment is tracking the location for the at least one user equipment, wherein the further apparatus is configured to manage at least one location request for at least one user equipment based on the indicator indicating whether the node associated with the location determination for the at least one user equipment is tracking the location for the at least one user equipment.

In a ninth aspect there is provided a non-transitory computer readable medium comprising program instructions for causing an apparatus to perform at least: managing at least one location request for at least one user equipment based on an indicator indicating whether a node associated with the location determination for the at least one user equipment is tracking the location for the at least one user equipment.

In a tenth aspect there is provided a non-transitory computer readable medium comprising program instructions for causing an apparatus to perform at least: generating at least one indicator to be transmitted to a further apparatus, the at least one indicator indicating whether a node associated with at least one other location determination for at least one user equipment is tracking the location for the at least one user equipment, wherein the further apparatus is configured to manage at least one location request for at least one user equipment based on the indicator indicating whether the node associated with the location determination for the at least one user equipment is tracking the location for the at least one user equipment.

The location determination may be a location determination for at least one other location request for the at least one user equipment.

The at least one indicator indicating whether a node associated with at least one other location determination for at least one user equipment is tracking the location for the at least one user equipment may be at least one indicator indicating whether a node associated with at least one other location determination for at least one user equipment is already tracking the location for the at least one user equipment.

The at least one other location request may be a preceding location request.

The at least one other location request and the at least one location request may be received substantially simultaneously.

The means may be configured to determine the at least one other location request from the at least one location request based on a policy.

The policy may be a quality of service based policy.

The quality of service policy may be based on at least one of request latency, request accuracy; and request periodicity.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
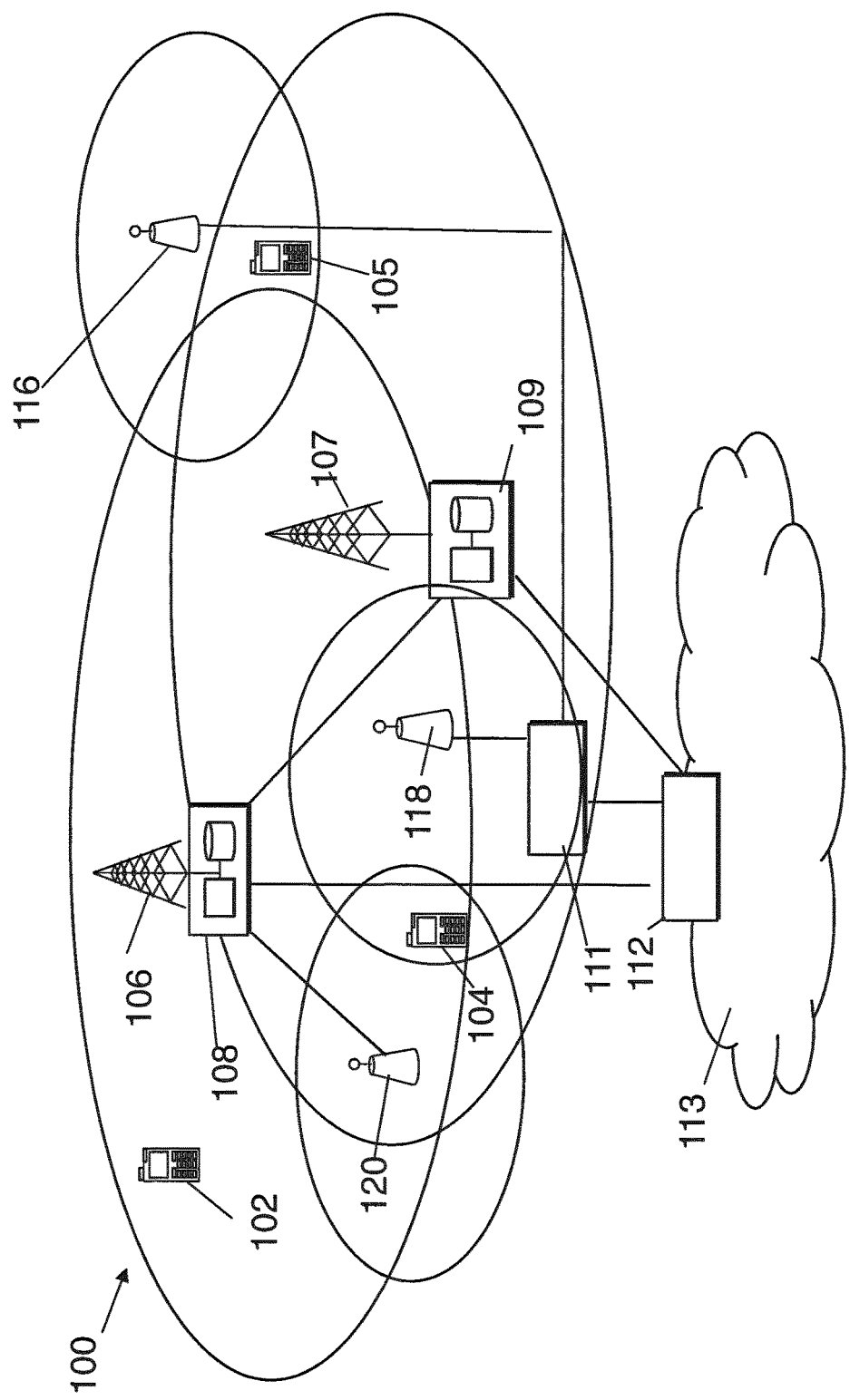
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. New functions are defined in the 5G system architecture, including an Access Management Function (AMF), Session Management Function (SMF), User Plane Function (UPF), among other network functions in the Next Generation Core (NGC). The 5G System supports new capabilities, including network slicing which may better tailor networks to application requirements and provide virtual networks for tenants. It also uses a services-based architecture the provides greater flexibility for introducing new services and features compared to the EPC which relied on fixed, peer-peer reference points. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates. MR may also support lower latency for air-interface transmission due to revisions in physical and MAC layer protocols.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, by a Centralized Unit (CU) at least partly, in a server, host or node operationally coupled to Distributed Unit (DU), which may connect to a remote radio head (RRH). It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) which may be a PSA (PDU Session Anchor) providing an anchor point for user IP, Ethernet or Unstructured user data sessions. The UPF may be responsible for forwarding frames back and forth between the DN (data network) and the gNBs through tunnels established over transport networks towards the UE(s) that want to exchange traffic with the DN.

The UPF is controlled by an SMF (Session Management Function) that receives policies from a PCF (Policy Control Function). The CN may also include an AMF (Access & Mobility Function) which terminates the control plane interface with the RAN and manages UE registrations and mobility.

Figure 2:
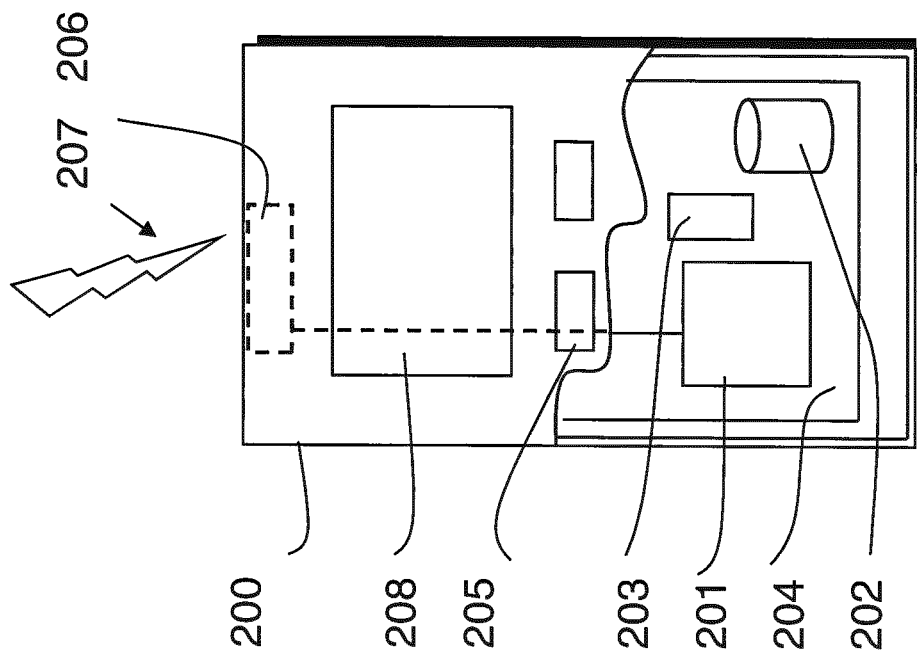
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
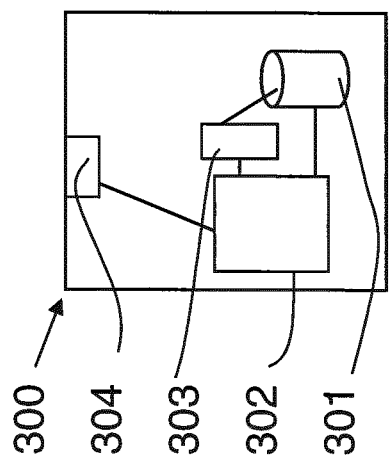
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus, such as a CU Control Plane (CU-CP) as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

As mentioned previously, the 5G system may support services such as location management functionalities. Currently under discussion in 3GPP RAN2 is the provision that there will be two different entities able to handle the location management functionalities, including the estimation of the location of the UEs. Within the core network the central location management function (LMF) is one and the RAN node is the other. Under this approach, although the initial consideration is that location requests handled by RAN will be different from the ones handled by the LMF (e.g. requests with low latency requirement handled by the RAN, and requests with more relaxed latency requirements handled by the LMF) there may be situations where there are running redundant or duplicated location estimation operations.

Figure 4:
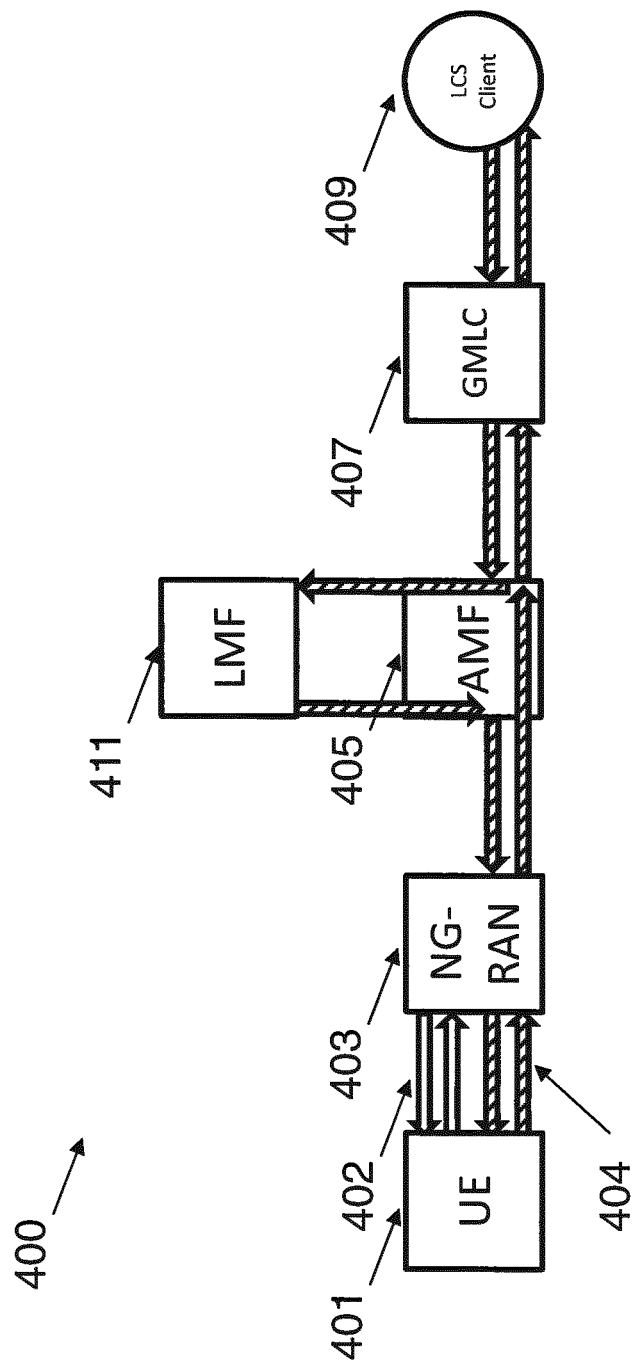
FIG. 4 shows a schematic diagram of a communications system showing redundant signalling in location estimation processes.

An example of the possible duplication of location estimation operations is shown in FIG. 4. FIG. 4 shows a user equipment (UE) 401 which is in communication with a next-generation radio access network (NG-RAN) 403 over the Uu interface. The next-generation radio access network (NG-RAN) 403 is in communication with an access management function (AMF) 405 over a N2 interface. The access management function (AMF) 405 is in communication with a location management function (LMF) 411 over a NLs interface and also in communication with a Gateway Mobile Location Centre (GMLC) 407 over a NLg interface. The Gateway Mobile Location Centre (GMLC) 407 is in communication with a location services client (LCS client) 409 over a Le interface. In the example shown in FIG. 4 a first location interchange 402 where the RAN 403 needs to estimate the location of a UE 401 (e.g. for mobility purposes). A second location interchange 404 for the same UE which does not require very stringent latency requirements is where at the same time there is also a request from an external client, the LCS client 409 which transmits a request through the GMLC 407 to the LMF 411 (via the AMF 405) which then forwards the request to the UE 401 via the AMF 405 and NG-RAN 403. The UE then returns the response to the LCS client 409 via the NG-RAN 403, AMF 405, and GMLC 407.

The concept as discussed in the following embodiments is the provision and operation of apparatus configured to orchestrate or manage location requests within networks. Such apparatus and the methods for operating them attempt to reduce duplicated location estimation signaling and processes and therefore prevent unnecessary wastage of resources that stems from an uncoordinated processing of location requests.

In some embodiments location information obtained by the RAN (or local LMF) may be made use of following further location estimation service requests. In some embodiments this can be represented in the definition of methods that coordinate potential duplicate location requests and introduce specific signaling exchanges between the network entities to prevent duplicate location estimations.

The following embodiments shown three examples wherein the apparatus and methods may be located where the UE is being tracked by a RAN and a new location request is issued.

In some embodiments the AMF may be configured to orchestrate the handling of the location estimate requests. In such embodiments a RAN is configured to inform the AMF that a UE is tracked. This information can then be used by the AMF such that when receiving a new positioning request, the AMF is configured to retrieve the position of the UE from the RAN and provide the position of the UE directly to the client. In these embodiments the LMF is not directly involved in the provision of the location estimate.

In some embodiments the RAN may be configured to orchestrate the handling of the location estimate requests. In such embodiments the RAN informs the LMF that a UE is tracked. In such embodiments any new positioning requests enable the LMF to retrieve the position of the UE directly from the RAN.

In some embodiments the UE may be configured to orchestrate the handling of the location estimation requests. In some embodiments the UE may be configured such that where the LMF requests the UE its capabilities the UE is configured to inform the LMF that it is being tracked. In such embodiments the UE can be configured to inform the LMF using a new type of message or a new information element within an existing message type.

In some embodiments when the UE location is being tracked by the RAN and RAN is responsible for updating UE location to the AMF/LMF and the RAN does not need any further UE location information the RAN can be configured to indicate to a respective network element that the UE is not anymore tracked by the RAN. The RAN may also indicate to a AMF/LMF that a UE RRC connection has been released (RRC_IDLE) or a UE connection has been released with a suspend (RRC_INACTIVE) and therefore the RAN is not actively tracking the UE location.

In some embodiments the UE is configured to indicate (for example in the UE orchestrating embodiments) that it is not being tracked by the RAN.

Although in the following examples the embodiments have been discussed with respect to a first RAN based location request followed by an external client based location request the embodiments can be configured to handle the opposite sequence (for example the LMF is handling an external location request, with a certain periodicity, and while this periodical location request is handled, the RAN may also request the location request).

Figure 5:
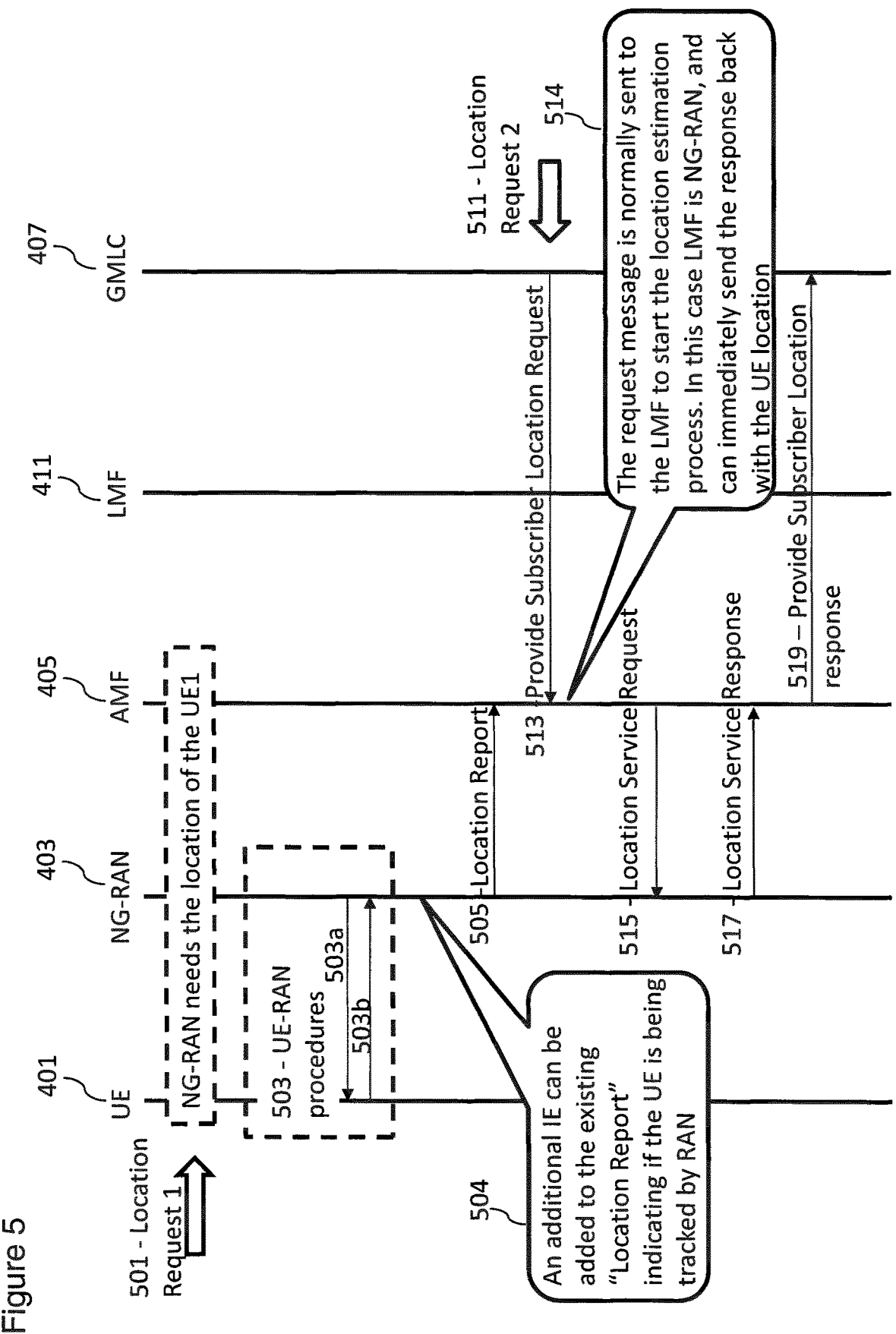
FIG. 5 shows a schematic diagram of a communications system and example signalling flow showing signalling in location estimation processes with access management function orchestration according to some embodiments.

In some embodiments the location request handling and orchestration may be performed by the Access Management Function (AMF). With respect to FIG. 5 is shown an example of the AMF orchestration of the location requests. The example in FIG. 5 shows an initialization of a first location request 501, for example where the NG-RAN 403 needs the location of the UE 401. In this example the NG-RAN 403 is configured to obtain or determine a location estimate using known UE-RAN procedures 503. These can for example comprise a location request 503a from the RAN 403 to the UE 401 and a location report or response 503b from the UE 401 to the RAN 403. The exchanges shown by references 503a and 503b are examples showing that there is communication between UE and the NG-RAN. These exchanges can include communications which determine and report aspects such as UE capabilities, measurements. In some embodiments the UE does not determine and report the location directly, but determines and reports measurements, which later can be used by the location server (which in this example is implemented within the RAN) to obtain the location.

The RAN 403 may then inform the AMF 405 that the UE is being tracked. In some embodiments the RAN 403 may be configured to reuse the received Location Report message with an additional information element (IE) (or indicator bit or message) to indicate to the AMF 405 that the UE 401 is being monitored by the RAN 403.

Thus, in some embodiments, the RAN is configured 504 to receive the location report message from the UE and then add an additional information element to the existing location report indicating if the UE is being tracked by the RAN.

The location report message with the additional information element indicating if the UE is being tracked by the RAN is then transmitted to the AMF 405 as shown in FIG. 5 by the arrow 505.

This location report message can then be received by the AMF 405 which is then configured to orchestrate any further location requests based on the received location report message with additional information element (or any suitable indication that the UE location is being tracked based on an earlier location request).

In some embodiments whenever the AMF 405 receives a (further) location request for that UE, the AMF is configured to obtain or pulls the location estimation of that UE from the RAN 403 instead of starting a parallel procedure.

This is shown for example in FIG. 5 by the initialization of a location request 2 511. Thus, for example, a Gateway Mobile Location Centre (GMLC) 407 is configured to provide a subscriber location request and transmit it to the AMF 405 as shown in FIG. 5 by arrow 513.

The AMF 405 having received the location request 513 for a UE 401 is configured to determine that the UE is currently being tracked and orchestrate the location request operation based on the received location report with additional information element.

Thus whereas a conventional AMF 405 received subscriber location request 513 is configured to generate and transmit a location request to the LMF 411 to start the location estimation process the AMF 405 is configured to identify that based on the earlier received location report that the NG-RAN is performing as a LMF. The orchestration or handling or management of the further location request is shown in FIG. 5 by reference 514.

Thus the AMF 405, in some embodiments, is configured to generate a location service request and transmit it to the RAN 403 as shown in FIG. 5 by arrow 515.

The NG-RAN 403 is configured to then generate and transmit a location service response 517 to the AMF 405 based on the receipt of the location service request.

The AMF may then generate and transmit 519 a subscriber location response based on the location service response from the NG-RAN 403 and in response to the subscriber location request 513.

In this example AMF 405 receives the indicator from the RAN (or the effective location determiner) that the RAN is tracking the location for the user equipment. In some embodiments the UE is configured to generate and transmit the same indicator (the location report, or location parameters or otherwise) to the AMF 405.

Figure 6:
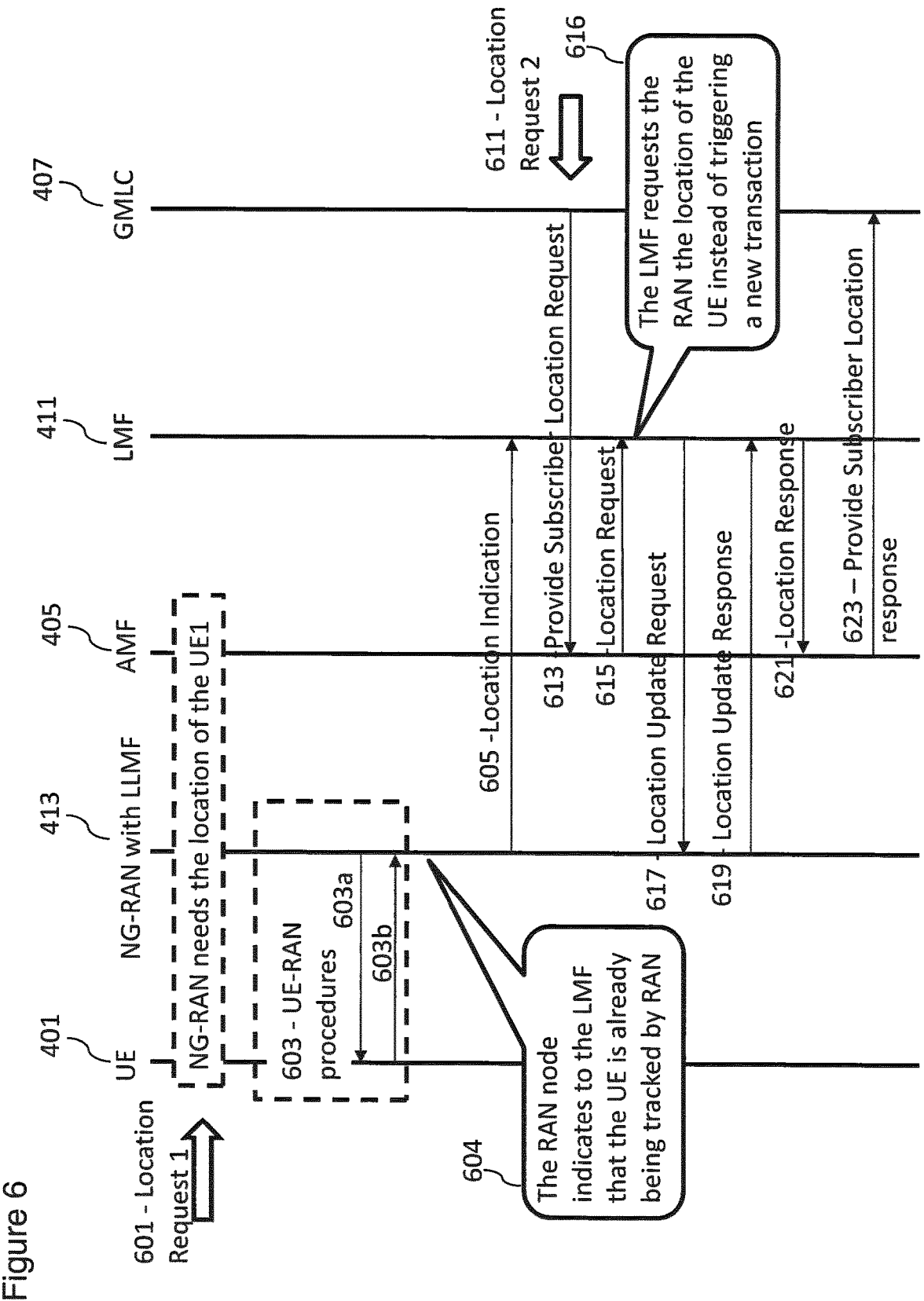
FIG. 6 shows a schematic diagram of a further communications system and example signalling flow showing signalling in location estimation processes with radio access network orchestration according to some embodiments.

In some embodiments the location request handling and orchestration may be performed by the radio access network (RAN) node. In this example the RAN node is a RAN node with additional local location manage function (LLMF) capability or functionality. With respect to FIG. 6 is shown an example of the RAN orchestration of the location requests. The example in FIG. 6 shows an initialization of a first location request 601, for example where the NG-RAN 413 needs the location of the UE 401. In this example the NG-RAN 413 (with LLMF) is configured to obtain or determine a location estimate using known UE-RAN procedures 603. These can for example comprise a location request 603a from the RAN 413 to the UE 401 and a location report or response 603b from the UE 401 to the RAN 413. The exchanges shown by references 603a and 603b are examples showing that there is communication between UE and the NG-RAN. These exchanges can include communications which determine and report aspects such as UE capabilities, measurements. In some embodiments the UE does not determine and report the location directly, but determines and reports measurements, which later can be used by the location server (which in this example is implemented within the RAN) to obtain the location.

The RAN 413 may then orchestrate 604 the handling of any further location requests by being configured to inform (or indicating to) the LMF 411 that the UE 401 is being tracked by the RAN. Thus in some embodiments the RAN is configured generate and transmit an indicator to the LMF 411 that the UE is being tracked by the RAN 413 as shown in FIG. 6 by arrow 605.

This indicator message can then be received by the LMF 411 which is then configured to assist in the orchestration of any further location requests based on the received indication that the UE location is being tracked by the RAN 413.

In some embodiments whenever the LMF 411 receives a further location request for that UE, the LMF is configured to obtain or pull the location estimation of that UE from the RAN 413 instead of starting a parallel procedure.

This is shown for example in FIG. 6 by the initialization of a location request 2 611. Thus for example a Gateway Mobile Location Centre (GMLC) 407 is configured to provide a subscriber location request and transmit it to the AMF 405 as shown in FIG. 6 by arrow 613.

The AMF 405 having received the location request 613 for a UE 401 is configured to pass this to the LMF 411 as shown in FIG. 6 by arrow 615.

The LMF 411 is then configured 616, based on the orchestration indicator from the RAN 413, to transmit a request to RAN 413 to obtain the location report instead of triggering a new transaction.

The generation and transmission of a request to the RAN 413 is shown in FIG. 6 by arrow 617.

The NG-RAN 413 is configured to then generate and transmit a location update response 619 to the LMF 411 based on the receipt of the location service request.

The LMF 411 may then generate and transmit 621 a location response back to the AMF 405.

The AMF may then be configured to generate and provide a subscriber location response 623 based on the location response from the LMF 411 and in response to the subscriber location request 613.

In such embodiments new messages introduced are the Location Update Request and the Location Update Response between (central) LMF and NG-RAN with LLMF but do not require modifications to the AMF node.

Figure 7:
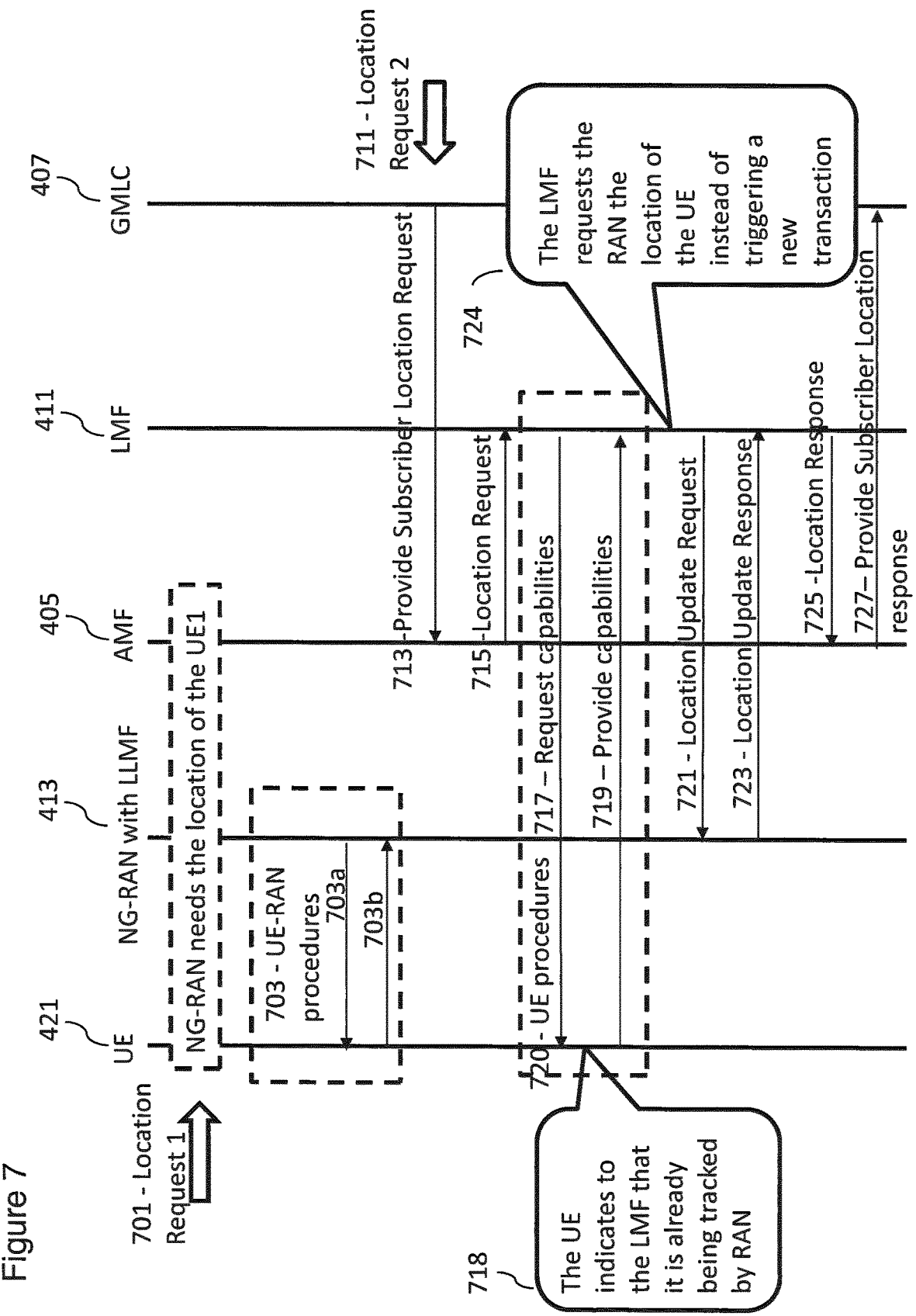
FIG. 7 shows a schematic diagram of another communications system and example signalling flow showing signalling in location estimation processes with user equipment location estimation orchestration according to some embodiments.

In some embodiments the location request handling and orchestration may be performed by the user equipment (UE) node. In this example the RAN node is a RAN node with additional local location manage function (LLMF) capability or functionality. With respect to FIG. 7 is shown an example of the UE orchestration of the location requests. The example in FIG. 7 shows an initialization of a first location request 701, for example where the NG-RAN 413 needs the location of the UE 401. In this example the NG-RAN 413 (with LLMF) is configured to obtain or determine a location estimate using known UE-RAN procedures 703. These can for example comprise a location request 703a from the RAN 413 to the UE 401 and a location report or response 703b from the UE 401 to the RAN 413.

The exchanges shown by references 703a and 703b are examples showing that there is communication between UE and the NG-RAN. These exchanges can include communications which determine and report aspects such as UE capabilities, measurements.

In some embodiments the UE does not determine and report the location directly, but determines and reports measurements, which later can be used by the location server (which in this example is implemented within the RAN) to obtain the location.

The UE 401 may then be configured to orchestrate 718 the handling of any further location requests by being configured to inform (or indicate to) the LMF 411 that the UE 401 is being tracked by the RAN.

This is shown for example in FIG. 7 by the initialization of a location request 2 711. Thus, for example, a Gateway Mobile Location Centre (GMLC) 407 is configured to provide a subscriber location request and transmit it to the AMF 405 as shown in FIG. 7 by arrow 713.

The AMF 405 having received the location request 713 for a UE 401 is configured to pass this to the LMF 411 as shown in FIG. 7 by arrow 715.

The UE can at some point be configured to inform or indicate to the LMF 411 that the UE is being tracked, for example within an information element within a UE capability request and response procedure (or any suitable UE procedure 720).

Thus, for example, as shown in FIG. 7 the LMF 411 generates and transmits to the UE 401 a capability request 717. The UE can then respond, by a capability response message 719. The capability response message 719 comprising an indicator that the UE is currently being tracked by a RAN node.

The LMF 411 can then be configured to based on the indicator that the UE is currently being tracked by a RAN node to transmit a request to the RAN 413 to obtain the location instead of triggering a new transaction.

The generation and transmission of a request to the RAN 413 is shown in FIG. 7 by arrow 721.

The NG-RAN 413 is configured to then generate and transmit a location update response 723 to the LMF 411 based on the receipt of the location service request.

The LMF 411 may then generate and transmit 725 a location response back to the AMF 405.

The AMF may then be configured to generate and provide a subscriber location response 727 based on the location response from the LMF 411 and in response to the subscriber location request 713.

In such embodiments new messages introduced are the information element or indicator within a suitable UE procedure but there is no modification to the AMF node.

In some embodiments the new information element may be an additional flag inserted within a known information element. For example the new information element may be an additional flag within a user location information element with respect to the AMF orchestrating example as shown in FIG. 4.

In the examples presented above the at least one other location request is a preceding location request. In other words there is shown in the examples above a situation wherein because of a preceding location request a node is tracking the location of the user equipment. This information can then be provided as an indicator to an apparatus which is configured to manage, handle or orchestrate a location request.

However in some embodiments the at least one location request and the at least one other location requests are two substantially simultaneous requests for the same UE. These two substantially simultaneous requests for the same UE can for example be sent to the same RAN node (or other location determining node). In some embodiments the RAN node could be configured to select which location request to handle (in other words determine to keep/reject one location request) based on a suitable policy. In some embodiments the policy can be configured to take as an input a quality of service (QoS) requirement, such as latency, accuracy or periodicity.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
    at least one processor and at least one memory including a computer program code, the at least one memory and computer program code configured to, with the at least one processor, cause the apparatus at least to:

manage at least one location request for at least one user equipment based on an indicator indicating whether a node associated with a location determination for the at least one user equipment is tracking the location for the at least one user equipment.

2. The apparatus as claimed in claim 1, wherein the apparatus is one of:
   an access management function node;
   a radio access network node comprising a location management function;
   a user equipment; and
   a location management function node.

3. The apparatus as claimed in claim 2, wherein the apparatus is an access management function and the apparatus is configured to:
   receive the at least one location request for the at least one user equipment;
   generate at least one location service request to be transmitted to the node associated with the location determination for the at least one user equipment when the indicator is indicating that the node associated with the location determination for the at least one user equipment is tracking the location for the at least one user equipment;
   receive, from the node associated with the location determination for the at least one user equipment, a location for the at least one user equipment; and
   provide the location for the at least one user equipment as a response to the at least one location request for the at least one user equipment.

4. The apparatus as claimed in claim 2, wherein the apparatus is configured to:
   forward the at least one location request for the at least one user equipment to a location management function node when the indicator is indicating that the node associated with the location determination for the at least one other location estimate for the at least one user equipment is not tracking the location for the at least one user equipment, wherein the location management function node is configured to start a location process;
   receive a location for the at least one user equipment from the location management function; and
   provide the location for the at least one user equipment as the response to the location request for the at least one user equipment.

5. The apparatus as claimed in claim 2, wherein the apparatus comprises a location management function, and the apparatus is configured to:
   receive the at least one location request for the at least one user equipment;
   generate at least one location update request to be transmitted to the node associated with the location determination for the at least one user equipment when the indicator is indicating that the node associated with the location determination for the at least one user equipment is tracking the location for the at least one user equipment;
   receive, from the node associated with the location determination for the at least one user equipment, a location for the at least one user equipment;
   provide the location for the at least one user equipment as a response to the at least one location request for the at least one user equipment.

6. The apparatus as claimed in claim 5, wherein the apparatus is configured to:
   start a location process for the at least one user equipment when the indicator is indicating that the node associated with the location determination for the at least one user equipment is not tracking the location for the at least one user equipment;
   obtain a location for the at least one user equipment;
   provide the location for the at least one user equipment as the response to the location request.

7. The apparatus as claimed in claim 1, wherein the apparatus is further configured to receive the indicator from one of:
   the user equipment in communication with the node associated with the location determination for the at least one user equipment; and
   the node associated with the location determination for the at least one user equipment.

8. The apparatus as claimed in claim 1, wherein the indicator is one of:
   an information element within a location report message;
   an information element within a location indication message;
   an information element within a capability message; and
   an information element within a measurement message.

9. The apparatus as claimed in claim 1, wherein the location determination for the at least one user equipment is obtained in response to at least one other location request.

10. An apparatus comprising:
    at least one processor and at least one memory including a computer program code, the at least one memory and computer program code configured to, with the at least one processor, cause the apparatus at least to:
    generate at least one indicator to be transmitted to a further apparatus, the at least one indicator indicating whether a node associated with a location determination for at least one user equipment is tracking the location for the at least one user equipment, wherein the further apparatus is configured to manage at least one location request for at least one user equipment based on the indicator indicating whether the node associated with the location determination for the at least one user equipment is tracking the location for the at least one user equipment.

11. The apparatus as claimed in claim 10, wherein the apparatus is one of:
    the user equipment in communication with the node associated with the location determination for the at least one user equipment; and
    the node associated with the location determination for the at least one user equipment.

12. The apparatus as claimed in claim 10, wherein the further apparatus is one of:
    an access management function, the access management function being configured to route the least one location request for at least one user equipment to the node associated with the location determination for the at least one user equipment when the indicator indicates the node associated with the location determination for the at least one user equipment is tracking the location for the at least one user equipment and a location management function for initialising a location determination otherwise;
    a location management function, the location management function being configured to receive the at least one location request from an access management function, the location management function configured request a location update from the node associated with the location determination for the at least one user equipment is tracking the location for the at least one user equipment and initialising a location determination otherwise.

13. The apparatus as claimed in claim 10, wherein the indicator is one of:
   an information element within a location report message;
   an information element within a location indication message;
   an information element within a capability message; and
   an information element within a measurement message.

14. The apparatus as claimed in claim 10, the apparatus is further configured to:
   receive a location service request or a location update request for the at least one user equipment from the further apparatus, and
   send a location information for the at least one user equipment to the further apparatus.

15. A method comprising:
   managing at least one location request for at least one user equipment based on an indicator indicating whether a node associated with a location determination for the at least one user equipment is tracking the location for the at least one user equipment.

16. The method as claimed in claim 15, further comprising receiving the indicator from one of:
   the user equipment in communication with the node associated with the location determination for the at least one user equipment; and
   the node associated with the location determination for the at least one user equipment.

17. The method as claimed in claim 15, wherein the method further comprises:
   receiving the at least one location request for the at least one user equipment;
   generating at least one location service request to be transmitted to the node associated with the location determination for the at least one user equipment when the indicator is indicating that the node associated with the location determination for the at least one user equipment is tracking the location for the at least one user equipment;
   receiving, from the node associated with the location determination for the at least one user equipment, a location for the at least one user equipment; and
   providing the location for the at least one user equipment as a response to the at least one location request for the at least one user equipment.

18. The method as claimed in claim 15, wherein the method further comprises:
   forwarding the at least one location request for the at least one user equipment to a location management function node when the indicator is indicating that the node associated with the location determination for the at least one user equipment is not tracking the location for the at least one user equipment, wherein the location management function node is configured to start a location process;
   receiving a location for the at least one user equipment from the location management function; and
   providing the location for the at least one user equipment as the response to the location request for the at least one user equipment.

19. The method as claimed in claim 15, the method further comprises:
   receiving the at least one location request for the at least one user equipment;
   generating at least one location update request to be transmitted to the node associated with the location determination for the at least one user equipment when the indicator is indicating that the node associated with the location determination for the at least one user equipment is tracking the location for the at least one user equipment;
   receiving, from the node associated with the location determination for the at least one user equipment, a location for the at least one user equipment; and
   providing the location for the at least one user equipment as a response to the at least one location request for the at least one user equipment.

20. The method as claimed in claim 19, wherein the method further comprises:
   starting a location process for the at least one user equipment when the indicator is indicating that the node associated with the location determination for the at least one user equipment is not tracking the location for the at least one user equipment;
   obtaining a location for the at least one user equipment; and
   providing the location for the at least one user equipment as the response to the location request.

* * * * *